(12) United States Patent
Nilssen

(10) Patent No.: US 8,434,515 B2
(45) Date of Patent: May 7, 2013

(54) SLEEVE VALVE

(75) Inventor: Bjorn Hagerup Nilssen, Sandnes (NO)

(73) Assignee: Ziebel AS, Stavanger (NO)

( * ) Notice: Subject to any disclaimer, the term of this patent is extended or adjusted under 35 U.S.C. 154(b) by 350 days.

(21) Appl. No.: 12/452,141

(22) PCT Filed: Jun. 17, 2008

(86) PCT No.: PCT/NO2008/000218
§ 371 (c)(1),
(2), (4) Date: May 28, 2010

(87) PCT Pub. No.: WO2008/156369
PCT Pub. Date: Dec. 24, 2008

(65) Prior Publication Data
US 2010/0292448 A1    Nov. 18, 2010

(30) Foreign Application Priority Data

Jun. 18, 2007    (NO) .................................. 20073112

(51) Int. Cl.
*F16K 3/26*    (2006.01)
*F16K 3/30*    (2006.01)
(52) U.S. Cl.
USPC ..................... 137/625.47; 251/172

(58) Field of Classification Search ............. 137/625.46, 137/625.47; 251/172, 174, 332
See application file for complete search history.

(56) References Cited

U.S. PATENT DOCUMENTS

| 2,558,087 | A | * | 6/1951 | Holl | 251/174 |
| 2,916,254 | A | * | 12/1959 | Wendell | 251/172 |
| 3,378,026 | A | * | 4/1968 | Oliver | 137/246.22 |
| 3,656,498 | A | * | 4/1972 | Grove et al. | 137/246.22 |
| 3,848,849 | A | * | 11/1974 | Alexander | 251/314 |
| 4,778,148 | A | * | 10/1988 | Kruger | 251/174 |
| 4,782,896 | A | | 11/1988 | Witten | |
| 4,921,044 | A | | 5/1990 | Cooksey | |
| 2006/0065314 | A1 | * | 3/2006 | Bazin et al. | 137/625.46 |

FOREIGN PATENT DOCUMENTS

| GB | 2 201 979 | 9/1988 |
| WO | WO 0121935 | 3/2001 |
| WO | WO 0246575 | 6/2002 |
| WO | WO 0246576 | 6/2002 |

OTHER PUBLICATIONS

International Search Report dated Sep. 30, 2008.

* cited by examiner

*Primary Examiner* — John Fox
(74) *Attorney, Agent, or Firm* — Jacobson Holman PLLC

(57) ABSTRACT

The present invention relates to a sleeve valve (1), which sleeve valve (1) can be used offshore or onshore to control the fluid flow between a hydrocarbon reservoir and a tubing in a well in the hydrocarbon reservoir. The sleeve valve (1) comprises an outer and an inner sleeve (2, 3) which are coaxially and rotatably arranged relative to one another, wherein in each of the sleeves (2, 3) there is provided at least one through opening (4, 18). The sleeves (2, 3) are rotated relative to one another with the aid of a suitable device, so that they can selectively be brought into an open, closed or other positions therebetween so as thereby to be able to control the fluid flow through the sleeve valve (1).

9 Claims, 2 Drawing Sheets

SLEEVE VALVE

This is a national stage of PCT/NO08/000218 filed Jun. 17, 2008 and published in English, which has a priority of Norway no. 2007 3112 filed Jun. 18, 2007, hereby incorporated by reference.

The present invention relates to a sleeve valve, which sleeve valve is used offshore or onshore to control the fluid flow between a hydrocarbon reservoir and a tubing in a well in the hydrocarbon reservoir. The sleeve valve comprises a first sleeve and a second sleeve which are coaxially and rotatably arranged relative to one another, each of the sleeves being provided with at least one through opening. The sleeves are rotated relative to one another with the aid of a suitable device, so that they can selectively be brought from a fully closed position to a fully open position and to intermediate positions so as thereby to be able to control the through-flow of fluid through the sleeve valve.

A hydrocarbon reservoir may contain both oil, gas and water. The production conditions, that is to say the amount of oil, gas and water and the pressure in the reservoir, usually vary throughout the reservoir, and also alter during the course of the production time. To be able to control production from the well, that is to say, control the inflow of oil, gas and water in the well, it is desirable, in order to have said control, to be able to shut off and admit inflow to the well at different points along the tubing.

As hydrocarbons are recovered from the reservoir, the natural pressure in the formation will diminish. To maintain the pressure and/or "wash" the formation of hydrocarbons so that a maximum amount of the hydrocarbons can be recovered, water or gas is injected from the well into the reservoir. Here, there will again be a desire to be able to control where the injection is to be carried out, and also the outflow of the fluid.

To control this inflow and outflow in a well, so-called sleeve valves can be used, with one or more sleeve valves usually being positioned along the well. The sleeve valves comprise two sleeves arranged coaxially and rotationally movable relative to one another. As both sleeves are made having through openings, movement between the valves will result in the openings being brought into and out of contact with one another in order to admit or shut off flow through the sleeve valve.

The reservoir from which hydrocarbons are recovered may be both wide and deep, and it may extend across various formations, the pressure in these formations perhaps being different. The tubing extends through the different pressure zones, and one or more sleeve valves may be arranged in each zone. As the sleeve valves are separate, independent units, sleeve valves in some zones may be kept open whilst others are kept closed. The zones can be separated from each other using isolation packers that are placed between the casing and the tubing, thereby preventing fluids from leaking between the zones along the outside of the tubing.

Depending on the well conditions concerned, there may be very high differential pressures across the valves in the well.

A high differential pressure in itself may give rise to leakage. In addition, differential pressure can lead to deformation of the sleeve valves, which may cause the sleeve valves to leak in a closed position.

The problem associated with leakage of the sleeve valves as a result of the large differential pressures can be solved by using flexible gaskets of non-metallic material. However, the temperature in the reservoir may be 100° C. or more, and the reservoir may contain constituents that with time corrode or damage the gasket materials. It has been found that in sleeve valves where sealing is based on flexible gaskets of non-metallic material, and after they have been in a closed position for some time, it is often impossible to obtain sealing again when the valve is opened and then closed again.

Flexible gaskets of non-metallic material are therefore not a satisfactory solution to the problem.

To avoid flexible gaskets and problems that arise in connection with their use, valves having metal-to-metal seals have been developed.

GB 2 201 979, U.S. Pat. No. 4,782,896 and U.S. Pat. No. 4,921,044 describe sleeve valves for controlling fluid flow between a hydrocarbon reservoir and a well in the hydrocarbon reservoir, said sleeve valves comprising a fixed outer sleeve and an inner sleeve that is movable between positions in which openings in the outer sleeve and the inner sleeve can be adjusted from a fully closed to a fully open position. These sleeve valves are however complex in structure.

In the light of the above, it is one of the objects of the invention to provide a sleeve valve that withstands substantial differential pressure without leakage occurring after the sleeve valve has been in use for some time.

Another object of the invention will be to provide a sleeve valve in which the disadvantages and/or problems that occur when using flexible gaskets are partly or wholly eliminated.

A further object of the invention is to provide a sleeve valve where the differential pressure helps to seal the sleeve valve, so that it does not leak in a closed position.

Another object of the invention is to provide a sleeve valve that is reliable and safe.

Yet another object of the invention is to provide a sleeve valve where a metal-to-metal seal is obtained, independent of whether the external pressure is greater than the internal pressure or vice versa.

Still another object of the invention will be to provide a sleeve valve where prevailing differential pressure actively helps to obtain metal-to-metal sealing as a result of one or more faces on an insert in an outer sleeve being subjected to pressure.

The sleeve valve according to the invention comprises an outer sleeve and an inner sleeve, said sleeves being arranged coaxially and rotatably movable relative to one another. Each of the sleeves is made having at least one through opening, so that rotation between the sleeves will result in the openings in the two sleeves being capable of being brought into contact with each other, thereby allowing a desired through-flow through the sleeve valve. The sleeves are also so configured that a channel or gap is formed between the interior surface of the outer sleeve and the exterior surface of the inner sleeve, whereby a fluid in the inner sleeve can flow between the outer and the inner sleeve. In each of the outer sleeve's opening(s) there is provided an insert, said insert being allowed a certain movement in the radial direction of the sleeve. The insert is so configured that it exerts a surface pressure against the inner sleeve, so that a metal-to-metal seal is obtained when the sleeve valve is closed, thereby preventing the sleeve valve from leaking.

The through openings in the inner sleeve may be made in the form of one or more openings, one or more slots etc.

The insert that is arranged in the outer sleeve is made with a through opening in its axial longitudinal direction, said opening being adapted to correspond with one or more openings in the inner sleeve. A fluid is thus allowed to flow through the insert when the sleeve valve is set in an open position. The inner end of the insert, i.e., the end resting against the surface of the inner sleeve when a metal-to-metal seal is formed, is configured complementarily to the surface of the inner sleeve. At a distance opposite from the inner end, i.e., towards an outer end of the insert, the outer surface of the insert is configured with a radially projecting flange, said flange extending towards the inside of the opening of the outer sleeve, thereby forming a gap between the outer sleeve opening and the insert's flange. Fluid that is inside the inner sleeve will be able to flow through this gap. The insert, on its inside, at the inner end, is also configured with a recess that extends in the whole of the circumferential direction of the insert.

A recess is arranged in the opening of the outer sleeve, said recess together with the insert's flange forming a chamber. At least one tension element is arranged in this chamber, so that the tension element, by virtue of its location between a contact portion in the recess and on the flange, presses the insert inwards towards the inner sleeve.

The metal-to-metal seal that arises through the insert in the outer sleeve being pressed down against the surface of the inner sleeve is provided in that the surfaces of the insert are subjected to a differential pressure, and in that the tension elements exert pressure on the insert. The tension elements that are arranged in the chamber will make a constant contribution to the surface pressure to which the insert is subjected, and this contribution will thus be independent of the differential pressure in the sleeve valve. Through its design, the insert will be subjected to the action of both the external and the internal pressure in the sleeve valve. This means that the sleeve valve, based on maximum differential pressure to which it is subjected and desired contribution from the tension elements, can easily and correctly be dimensioned so as to obtain a metal-to-metal seal which will not leak in a closed position.

The tension element located in the chamber formed by the outer sleeve's recess and the insert's flange may be in the form of a helical spring, it may be a spring comprising an elastomeric material, or it may consist of one or more leaf springs, one or more disc springs, or a combination thereof. In a preferred embodiment, the tension element consists of a stack of disc springs.

When the sleeve valve is in a closed position, the radially movable insert will be subjected to a force that is provided by the pressurised fluid on the outside of the outer sleeve flowing into the insert. Since the through opening of the insert is configured symmetrically about its longitudinal axis, the external pressure will not act on the insert in its radial direction. As the area of an outer surface of the insert, which is subjected to a pressure in the axial direction of the insert, is greater than an area on the internal recess in the insert which is subjected to the external pressure, but where this is oppositely directed, the offset area will result in the external pressure making a contribution that will press the insert inwards towards the inner sleeve. However, the insert will also be subjected to an internal pressure, this being the pressure that is present in the inner sleeve. Here, the fluid that is inside the inner sleeve will flow out of the sleeve and into the space between the inner and the outer sleeve and then through the channels formed by the insert's flange and the opening of the outer sleeve, in order thus to fill the chamber where also the tension elements are provided. In this case too, the symmetry of the insert and the opening in the inner sleeve will not make a contribution that will act on the insert in its radial direction. As the areas of the faces subjected to a pressure making a contribution in the axial direction of the insert are different, the area of the faces that force the insert inwards towards the inner sleeve being greater than the area of the faces that force the insert out of contact with the inner sleeve, an offset area will be obtained which will make a contribution that will press the insert inwards towards the inner sleeve. The tension elements provided in the chamber formed by the inner recess in the outer sleeve and the insert's flange will also help to press the insert inwards towards the inner sleeve.

The above embodiment thus provides a sleeve valve where an offset area on an outer surface of the insert that is subjected to pressure externally by the outer sleeve is identical to the area of an offset area in the chamber, which is subjected to a pressure internally from the inner sleeve, the sum of these areas being as great as the area of the inner end of the insert that forms a surface pressure against the surface of the inner sleeve, independent of the direction of the pressure differential between the external and internal pressure.

The term "offset area" in the present application should be understood to mean the difference between the areas on which two oppositely directed forces act; similarly, the "differential pressure" should be understood to be the difference between the internal and external pressure to which the sleeve valve is subjected.

The sleeve valve may be of a type where the inner and outer sleeves are movable relative to one another in that the outer or the inner sleeve is rotatable about the longitudinal direction of the tubing, the outer or inner sleeve may be slidable in the longitudinal direction of the tubing, or also a combination of the above, where the outer and inner sleeve, for example, may be movable along a helical path in the longitudinal direction of the tubing. The inner or the outer sleeve may further be formed as a part of the tubing. The outer and the inner sleeve may have one or more openings that correspond with corresponding openings in each sleeve. The relative movement of the two sleeves will be effected by means of a remote-controlled tool that is powered by an electric or hydraulic motor, for example, via coiled tubing or electric cables. In both cases, the movement can be transmitted to the inner sleeve via a gripping tool having clamping jaws that are actuated electrically or hydraulically. The movement of the two sleeves relative to one another may also be produced by devices that are integral parts of the sleeve valve, for example, a hydraulic motor or the like. In addition to the sleeve valve being movable between positions in which the openings of the two sleeves are in contact or not in contact with each other, the sleeve valve may also be movable to intermediate positions, so as to enable the fluid flow to be controlled to intermediate positions between closed and fully open flow. The sleeve openings may also be arranged in rows along the sleeves, and be arranged symmetrically around the sleeves.

The invention will now be explained in connection with a description of a particular embodiment and with reference to the drawings, wherein.

Figure 1:
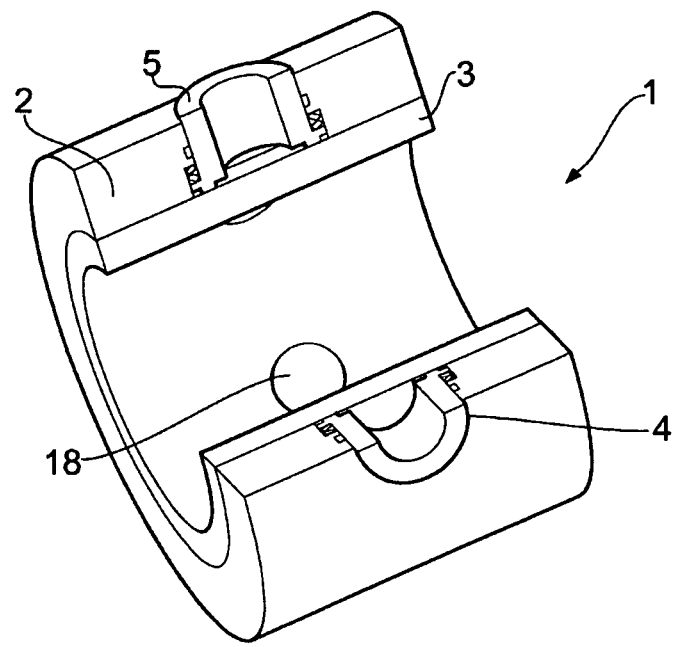
FIG. 1 is a cut-away view of a sleeve valve in the longitudinal direction.

FIG. 1 is a cut-away view of a sleeve valve 1 according to the present invention in the longitudinal direction. The sleeve valve 1 comprises an outer sleeve 2 and an inner sleeve 3, said sleeves being arranged movably relative to one another. Four openings 4, 18 are provided in each of the sleeves 2, 3, so that rotation of either one or other of the sleeves 2, 3 will result in the openings 4, 18 overlapping each other to a greater or lesser extent, so as to allow a through-flow through the sleeve valve 1. It can also be seen in the figure that in each opening 4 in the outer sleeve 2 there is provided a radially movable insert 5, whose mode of operation and function will be explained in more detail below with reference to FIG. 2.

Figure 2:
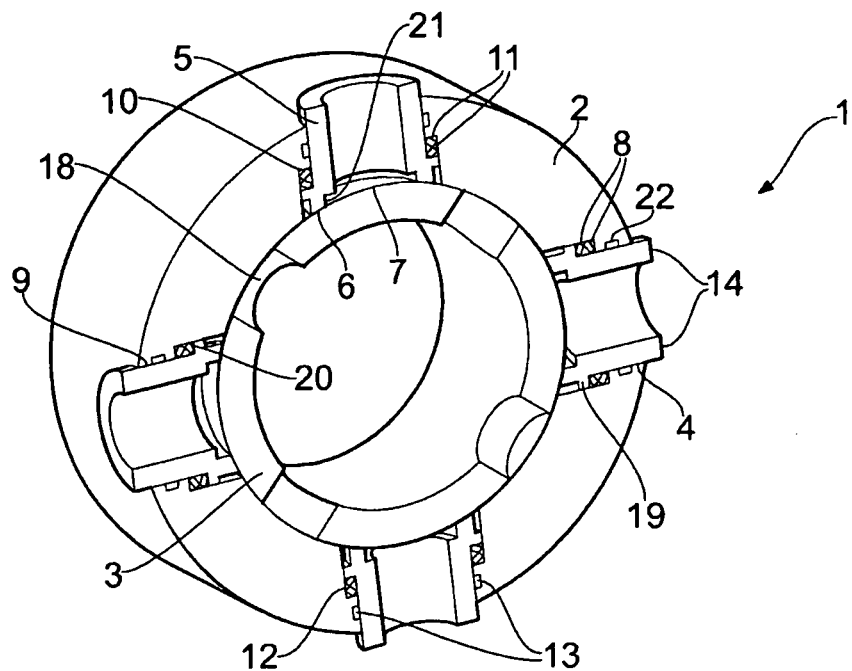
FIG. 2 shows a cross-section of a closed sleeve valve.

In a somewhat enlarged sleeve valve 1 in FIG. 2, details of the insert 5 are shown, the insert 5 being allowed a radial movement in the outer sleeve 2. The insert 5 consists of a machined bushing, where an inner end 6 of the insert 5 cooperates with a surface 7 on the inner sleeve 3, thereby forming a metal-to-metal seal when there is a differential pressure in the sleeve valve 1; the inner end 6 can be seen to be curved with the same radius as the surface 7 of the inner sleeve, so that the metal-to-metal seal obtained in that the sleeve valve 1 is subjected to a differential pressure will be tight. Furthermore, the insert 5, on its outer surface 9 at a distance above the inner end 6, is configured with a projecting flange 19, said flange 19, together with a recess 11 on the inside of the outer sleeve cooperating and forming a chamber in 12 in the outer sleeve 2, so that the insert 5 is only allowed a certain radial movement. On its inside, the insert 5, at the inner end 6, is configured with a recess 21 which extends along the whole circumferential direction of the insert 5.

In the chamber 12, between the outer sleeve 2 and the insert's 5 flange 19, there is arranged one or more tension elements 8. The tension elements 8 are arranged between the edge 10 of the recess 11, which is perpendicular to the internal opening 4 of the outer sleeve 2 and an edge 20 on the insert's 5 flange 19, so that the insert 5 will be pushed inwards towards the inner sleeve 3 due to the force in the tension elements 8.

To prevent leakage between the insert 5 and the opening 4 in the outer sleeve 2, one or more gaskets 13 are provided above the chamber 12 between the insert 5 and the outer sleeve 2. In one embodiment of the invention, the gaskets 13 are placed in a recess 22 in the outer sleeve 2, but a recess 23 can also be provided in the outer surface 9 of the insert 5, as shown in FIG. 3.

Figure 3:
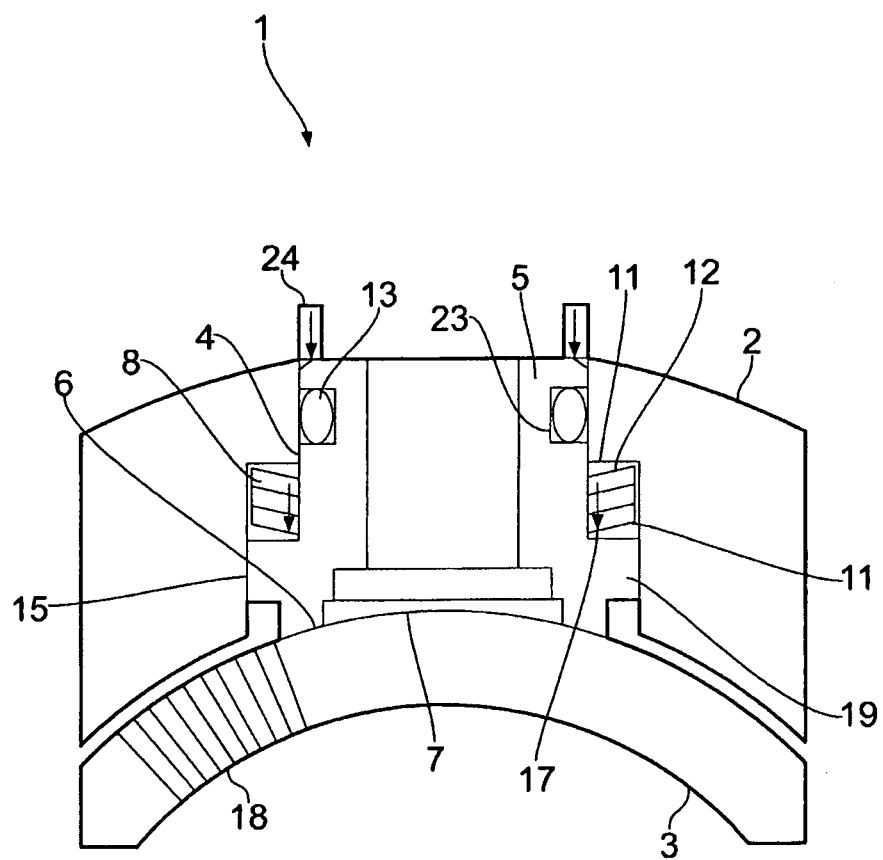
FIG. 3 shows a cross-section of an enlarged part of the sleeve valve, where the sleeve valve is closed.

In FIG. 3 the sleeve valve 1 is further shown in a closed position, the inner sleeve 3 having been rotated and stopped so that the openings 18 of the inner sleeve 3 are located between the openings 4 of the outer sleeve 2. Because of the differential pressure and the tension elements 8, the insert 5 is pressed down into contact with the inner sleeve 3, so that a tight metal-to-metal seal is obtained between the outer and the inner sleeve 2, 3.

To allow a desired surface pressure between the inner sleeve 3 and the insert 5 to be obtained, the insert 5 must be so configured that the offset area 24 that is subjected to an external pressure is as large as the offset area 17 that is subjected to an internal pressure, the inner end 6 of the insert, which exerts a surface pressure on the surface 7 of the inner sleeve 3, then having an area that is the sum of the offset external and internal areas that are subjected to pressure.

This is shown in FIG. 3, where an offset area 24 on the outer surface 14 of the insert 5 is subjected to a pressure which will produce a force that presses the insert 5 inwards into contact with the surface 7 of the inner sleeve 3. At the same time as the external pressure forces the insert 5 downwards, an internal pressure in the inner sleeve 3 will also contribute to a force that will press the insert 5 inwards towards the inner sleeve 3. This will take place in that the sleeve valve 1, which is shown in a closed position in the figure, will allow the fluid that is in the inner sleeve 3 to flow out through the openings 18 and then between the inner and the outer sleeve 3, 2, through a gap 15, in order thereafter to fill the chamber 12. Here, the insert 5 will be so configured that the internal pressure acting on an offset area 17 on the insert's 5 flange 19 will provide a force that helps to press the insert 5 inwards towards the inner sleeve 3, this offset area 17 being as large as the offset area 24 on the outer face 14 of the insert 5, and where at the same time the sum of these two areas 17, 24 will be as great as the area with which the insert 5, by means of its inner end 6, exerts a surface pressure against the surface 7 of the inner sleeve 3.

The invention has now been explained using a non-limiting embodiment. A person of skill in the art will understand that a number of variations and modifications of the sleeve valve as described could be made within the scope of the invention as defined in the appended claims.

The invention claimed is:

1. A sleeve valve comprising
an outer sleeve and an inner sleeve arranged therein, the sleeves being rotatable relative to one another and wherein in each of the sleeves there is provided at least one through aperture, fluid flow through the sleeve valve being allowed by an overlapping of the sleeves' through openings, and wherein in the through opening of the outer sleeve there is arranged, seen in relation to a longitudinal axis of the sleeve valve, at least one radially movable insert, an inner metallic end of the insert cooperating with a metallic surface on the inner sleeve to provide a metal-to-metal seal, wherein between the outer sleeve and the insert there is formed a chamber, and wherein in the chamber there is provided a tension element, and
one or more gaskets arranged radially outside the chamber between the outer sleeve and the insert, wherein an offset area on an outer face of the insert, which is subjected to a pressure externally by the outer sleeve, is equal to the area of an offset area in the chamber, which is subjected to a pressure internally from the inner sleeve, the sum of these areas being as great as the area of the inner end of the insert which creates a surface pressure against the surface of the inner sleeve, independent of the direction of the pressure differential between external/internal pressure.

2. The sleeve valve according to claim 1, wherein the insert is a circular bushing with a through aperture.

3. The sleeve valve according to claim 1, wherein the tension element can be selected from the group consisting of leaf springs, helical springs, disc springs, elastomeric material, several layers and/or combinations thereof.

4. The sleeve valve according to claim 1, wherein the through openings in the sleeve can be a single opening, a plurality of smaller openings, one or more slots etc.

5. The sleeve valve according to claim 1, wherein between the stationary outer sleeve opening and the insert's outer surface there is provided a gap.

6. The sleeve valve according to claim 1, wherein the tension element is located in the pressure chamber.

7. The sleeve valve according to claim 1, wherein the sleeves can be provided with a plurality of through openings, in rows and columns, in a random pattern etc.

8. The sleeve valve according to claim 1, wherein the inner rotating sleeve is hydraulically actuatable or actuatable by means of a separate tool.

9. The sleeve valve according to claim 1, wherein a device brings the sleeve valve from a closed to an open position or vice-versa.

* * * * *

UNITED STATES PATENT AND TRADEMARK OFFICE
CERTIFICATE OF CORRECTION

| | | | |
|---|---|---|---|
| PATENT NO. | : | 8,434,515 B2 | Page 1 of 1 |
| APPLICATION NO. | : | 12/452141 | |
| DATED | : | May 7, 2013 | |
| INVENTOR(S) | : | Bjorn Hagerup Nilssen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this
Eighth Day of September, 2015

Michelle K. Lee
*Director of the United States Patent and Trademark Office*